(12) United States Patent
Silvestre et al.

(10) Patent No.: US 12,243,081 B2
(45) Date of Patent: Mar. 4, 2025

(54) SYSTEM AND METHOD FOR PRESENTING ONE OR MORE PRODUCTS TO A USER VIA A VIRTUAL ASSISTANT

(71) Applicant: PATTY, LLC, Deerfield Beach, FL (US)

(72) Inventors: Luis Silvestre, Miramar, FL (US); Seth Cohen, Lighthouse Point, FL (US)

(73) Assignee: PATTY, LLC, Deerfield Beach, FL (US)

( * ) Notice: Subject to any disclaimer, the term of this patent is extended or adjusted under 35 U.S.C. 154(b) by 688 days.

(21) Appl. No.: 17/485,931

(22) Filed: Sep. 27, 2021

(65) Prior Publication Data

US 2022/0036410 A1 Feb. 3, 2022

Related U.S. Application Data

(63) Continuation-in-part of application No. 16/945,082, filed on Jul. 31, 2020, now Pat. No. 11,651,439.

(60) Provisional application No. 62/886,393, filed on Aug. 14, 2019, provisional application No. 62/881,706, filed on Aug. 1, 2019.

(51) Int. Cl.
*G06Q 30/02* (2023.01)
*G06Q 30/0203* (2023.01)
*G06Q 30/0282* (2023.01)
*H04L 51/02* (2022.01)
*H04M 3/523* (2006.01)

(52) U.S. Cl.
CPC ..... *G06Q 30/0282* (2013.01); *G06Q 30/0203* (2013.01); *H04L 51/02* (2013.01); *H04M 3/5233* (2013.01)

(58) Field of Classification Search
CPC ............ G06Q 30/0282; G06Q 30/0203; H04L 51/02; H04M 3/5233
See application file for complete search history.

(56) References Cited

U.S. PATENT DOCUMENTS

| 10,332,297 B1 * | 6/2019 | Vadodaria | ............ G06F 3/0482 |
| 10,347,241 B1 * | 7/2019 | Meng | .................... G10L 15/063 |
| 2005/0134935 A1 * | 6/2005 | Schmidtler | ............ G06F 40/10 |
| | | | 358/448 |
| 2012/0046975 A1 * | 2/2012 | Stolze | .................... G06Q 30/02 |
| | | | 705/4 |

(Continued)

FOREIGN PATENT DOCUMENTS

CA 2979627 A1 * 3/2018 ......... G06F 21/6263

*Primary Examiner* — Scott C Anderson
(74) *Attorney, Agent, or Firm* — Cozen O'Connor (57) ABSTRACT

During a communication session, a virtual assistant prompts a user for information pertaining to one or more products, and identifies relevant products based on data collected from the user. These one or more products are presented to the user, and a level of intent or urgency of the user to purchase the one or more products is determined based on determining a plurality of tone scores corresponding to a plurality of tone types for each of the words, phrases, or sentences of the language input received from the user via a user interface. A network of producers is scanned and a live producer offering the identified products is identified and presented to the user. The virtual assistant determines whether or not to transfer the user to the identified live producer based on application of transfer criteria to the evaluated level of intent or urgency of the user.

26 Claims, 8 Drawing Sheets

(56) References Cited

U.S. PATENT DOCUMENTS

| | | | |
|---|---|---|---|
| 2014/0032246 A1* | 1/2014 | Bhatt | G06Q 40/08 |
| | | | 705/4 |
| 2016/0246966 A1* | 8/2016 | Batrouni | G06F 21/577 |
| 2016/0334230 A1* | 11/2016 | Ross | G05D 1/0027 |
| 2018/0191884 A1* | 7/2018 | Goldgraber | H04M 3/42221 |
| 2019/0205727 A1* | 7/2019 | Lin | G06F 18/217 |
| 2019/0220773 A1* | 7/2019 | Terry | G06N 5/02 |
| 2020/0020165 A1* | 1/2020 | Tran | G06F 3/011 |
| 2020/0111201 A1* | 4/2020 | Kuruvilla | G06V 20/62 |
| 2021/0046975 A1 | 2/2021 | Zemskov | |

* cited by examiner

10

11 - Initiating a session through an interface with a virtual assistant

12 - Virtual assistant prompts the user to answer a series of pre-qualifying questions 13 - Adjust parameters of the virtual assistant to accommodate the user 14 - Virtual assistant prompts user for information and receives user's description 15 - Evaluates the user's level of intent or urgency to purchase benefits products 16 - Identify and present relevant benefits products and services based on eligibility determined by responses from the user 17 - Scan network of producers to identify a producer offering benefits products presented to the user 18 - Transfers the user to an identified producer for enrollment

Sample statement from Sofia

402 — "Now that I've presented you with the available options for insurance coverage in your area, can I transfer you to an agent to sign up now?"

Sample statement from a consumer from actual call

404 — "I mean, do you have the plan that you can send to me via e-mail or whatever, because I'm going to do some checking around. I have some time and that's the one thing that I'm going to do. And he told me to do some of my own homework on it. I just don't know enough about United Health Care, but I know I'm going to work. On the whole, I think that it ought to be a fairly solid plan. I think that might be what we're looking for. I just need a major, not a call just as a backup in case of hospitalization which I was going to expect to have."

FIG. 4A

Tone Analyzer Results

| 406 Analysis | 405 Sentence_ID | Sentence | 408 Score | 409 Tone |
|---|---|---|---|---|
| | 0 | I mean, do you have the plan that you can send to me via e-mail or whatever, because I'm going to do some checking around. | 0.878702 | Tentative |
| | 1 | I have some time and that's the one thing that I'm going to do.", | 0.681699 | Tentative |
| | 2 | And he told me to do some of my own homework on it. | 0.505502 | Anger |
| | 2 | And he told me to do some of my own homework on it. | 0.716301 | Tentative |
| | 3 | I just don't know enough about United Health Care, but I know I'm going to work. | 0.762356 | Analytical |
| | 3 | I just don't know enough about United Health Care, but I know I'm going to work. | 0.798791 | Tentative |
| | 4 | On the whole, I think that it ought to be a fairly solid plan. | 0.646387 | Analytical |
| | 4 | On the whole, I think that it ought to be a fairly solid plan. | 0.681699 | Tentative |
| | 5 | I think that might be what we're looking for. | 0.856622 | Tentative |
| | 6 | I just need a major, not a call just as a backup in case of hospitalization which I was going to expect to have. | 0.716804 | Analytical |
| | 6 | I just need a major, not a call just as a backup in case of hospitalization which I was going to expect to have. | 0.769251 | Tentative |

| Tone Tolerances to Transfer (4T Score) | Tolerance | Score | Result |
|---|---|---|---|
| Anger | 0.65 | 0.505502 | Acceptable to Transfer |
| Fear | N/A | #N/A | #N/A |
| Joy | N/A | #N/A | #N/A |
| Sadness | N/A | #N/A | #N/A |
| Analytical | 0.85 | 0.708515667 | Acceptable to Transfer |
| Confident | N/A | #N/A | #N/A |
| Tentative | 0.7 | 0.769009286 | Terminate |

FIG. 4D

Calculated Response from Sofia

430 — I understand that you have more research to do. I'm available 24/7 and will recall exact details of our conversation in the future. Coverage for your family is a very important decision, so please beware that not all plans are easy to compare and there are cheap plans on the market with very little benefit that can put your family at risk. Please say "transfer me" if you'd like me to have an agent tell you more.

FIG. 4E

SYSTEM AND METHOD FOR PRESENTING ONE OR MORE PRODUCTS TO A USER VIA A VIRTUAL ASSISTANT

BACKGROUND OF THE INVENTION

Field of the Invention

The present invention relates to a system and method for automatically referring a qualified buyer of life and health insurance, or benefits products and services (hereinafter "benefits products") from an insurance carrier, benefits company, healthcare discount plan provider, health care sharing ministry, or similar entities (hereinafter "benefits provider") to a benefits consultant, qualified salesperson, duly licensed insurance agent, producer or broker (hereinafter "producer").

Description of the Related Art

Consumers of individual benefits products commonly use comparison shopping internet websites to research benefits products. The benefits products competitive landscape is disarrayed, consisting of benefits products ranging from federally and U.S. regulated types of health and life products, levels of coverage, premium, and limitations that put the consumer at risk for adverse selection. Also, due to the nature of the chaotic environment, the marketplace is an outlet for fraudulent benefits products. In many cases, consumers seek the assistance of a producer to select a product or service. In some cases, prior to speaking with a live producer directly, the consumer will be filtered through a third-party lead generation service designed to allow only qualified buyers to pass through to the producer.

Conventional third-party lead generation services employ human phone sales support representatives to ask the consumer qualifying questions to determine the product or service to be referred to the consumer. Examples of qualifying questions range from location, date of birth and gender to health history, qualifying life events, medications and affordability. The cost to acquire a consumer customer includes the cost of human phone sales support representatives in the prequalification phase of many enrollments.

Conventional systems have been used for extracting user data to identify available benefits products based on responses from the consumer. U.S. Pat. No. 9,495,700 describes the use of branded virtual characters on a server computer which are accessed by an employee at a remote client computer over a network in order to engage and educate users regarding alternate benefit plans. Throughout the process, the system employs a portfolio-driven approach to identify inter-dependencies among different benefit products and plans and prioritize and recommend "portfolio-level" benefit solutions. The employee can be automatically enrolled in the selected benefit plan. This system has the drawback of needing a computer interface to access the system over the internet and can be cumbersome for a person to navigate, especially for unsophisticated computer users.

It is desirable to provide an artificial intelligence-based telephonic system and method to collect user data using telephonic communication, automatically determine from the user data relevant to the benefits products and automatically refer a qualified buyer to a qualified producer.

SUMMARY OF THE INVENTION

The present invention relates to an artificial intelligence-based multi-channel system and method to evaluate a buyer or consumer's intent to purchase benefits products in real time. The system and method determine the buyer or consumer's needs, identifies and presents relevant benefits products based on eligibility to the buyer or consumer. The system and method can transfer the buyer or consumer to a live producer to facilitate an enrollment process for the benefits products.

In one embodiment, a session is initiated by a user, such as either the buyer or consumer or system. The user can initiate the session by phone, SMS, chat, mobile app, or Messenger. Once a session is initiated, the user is introduced to a virtual assistant. In alternative embodiments, the virtual assistant can be a bot, chatbot, conversational artificial intelligence (AI), or cognitive digital assistant. The virtual assistant has an audio interface to present audio to a user and receive audio from the user. The virtual assistant can greet and prompt the user to answer a series of pre-qualifying questions. The virtual assistant is artificial intelligence enabled to receive voice via an audio interface which is transferred to a server to be interpreted with artificial intelligence. Responses from the server can be sent back via audio to the user's audio interface. The virtual assistant can be implemented in a conversational manner for receiving information from a user and generating responses using cognitive learning abilities during the conversation. The virtual assistant can include natural language processing. The virtual assistant can implement context switching during the conversation. The cognitive learning abilities of the virtual assistant can include a semantic memory, episodic memory for learning from past conversations, analytic memory for understanding trend of data, and affective memory for understanding emotion and deep back projection networks for learning process flows via empirical learning. The virtual assistant can be considered to be a "trusted" virtual producer for the user as compared to a human, motivated to make any sale.

In one embodiment, the system can internalize the user's answers and not repeat questions which limits buyer or consumer frustration; and in the session, accent and tone of the virtual assistant accommodates the user. Using the virtual assistant and further prompting, the system can evaluate the user's level of intent or urgency to purchase benefits products. The virtual assistant can utilize third party rate quoting services and benefits providers' specific underwriting guidelines and requirements from multiple benefits providers to identify and present relevant benefits products through the virtual assistant to the user. In one embodiment, the virtual assistant can scan a network of live producers in a resident state of a buyer or consumer to identify a producer offering benefits products presented to the user during the session. The virtual assistant can transfer the buyer or consumer to the producer for enrollment.

The system can provide security of the user interface and transmitted data. In one embodiment, data encryption can be used during transport of data.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

As used in this application, the terms "component", module," "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Figure 1:
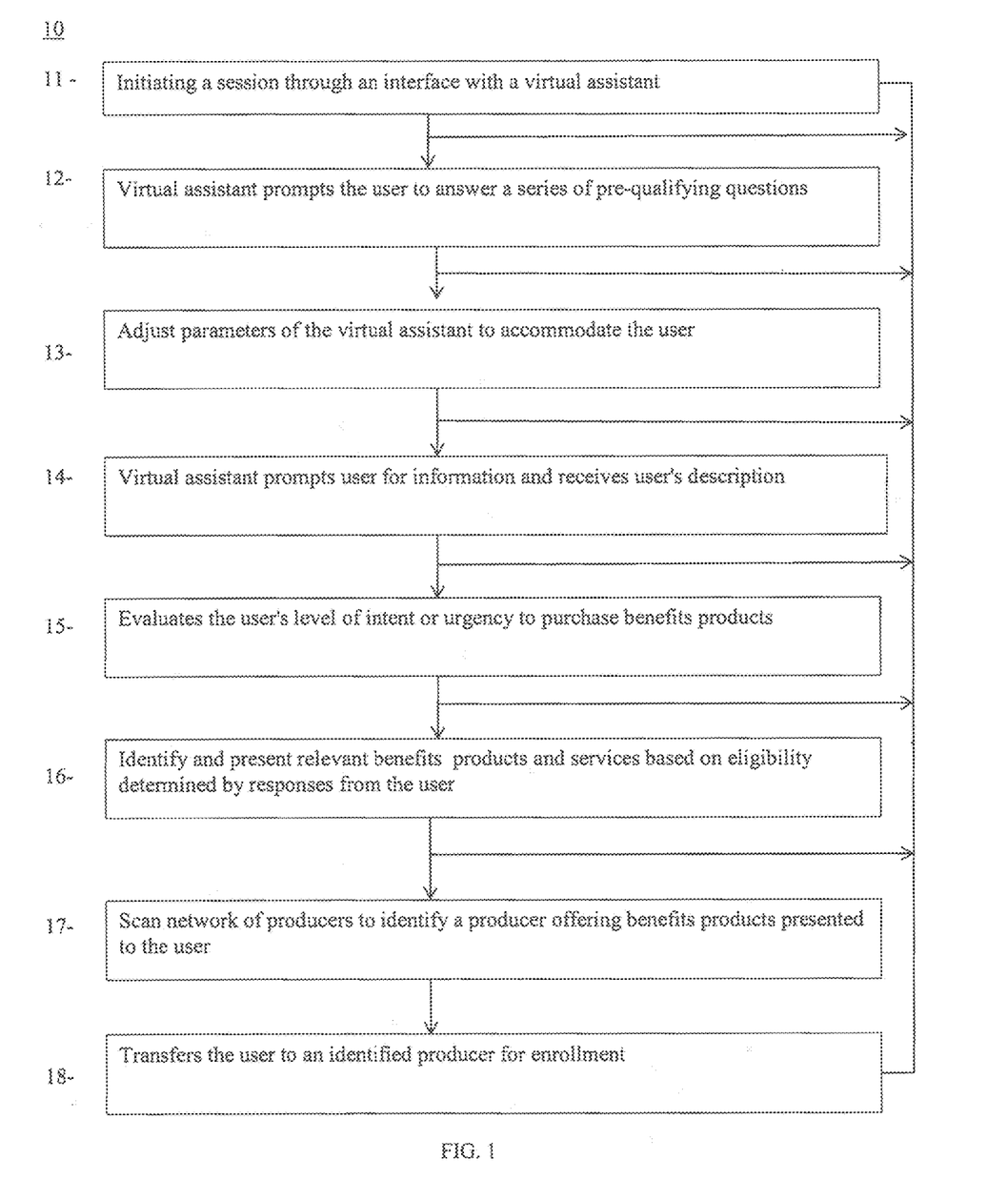
FIG. 1 is a flow diagram of one embodiment of a method for pre-qualifying a consumer for benefits products based on eligibility and referring a producer to facilitate the enrollment process performed by a system of the present invention.

FIG. 1 is a flow diagram of an embodiment of interactive method 10 for interactively presenting one or more relevant benefits products based on eligibility to a user and enrolling of the user with determined benefits products. In step 11, a session with a virtual assistant is initiated through an interface. For example, the user can initiate the session with the system using an interface of a phone, SMS, chat, mobile app, or Messenger. Once a session is initiated, in step 11, the user is introduced to a virtual assistant. The virtual assistant can greet and prompt the user to answer a series of pre-qualifying questions in step 12. In one embodiment, the system can internalize the user's answers and not repeat questions which limits buyer or consumer frustration. The virtual assistant presents audio to the user and receives audio from the user. The virtual assistant is artificial intelligence based to receive voice via an audio interface which is transferred to a server to be interpreted with artificial intelligence in real time. Responses from the server can be sent back via audio to the user's audio interface.

In step 13, during the session between the user and the virtual assistant, the system can adjust parameters of the virtual assistant to accommodate the user. For example, language and tone of the virtual assistant can be selected or adjusted. The virtual assistant can utilize commercial technologies including, for example, Sentiment Analysis, Tone Analyzer and Personality Insights to adjust parameters of the virtual assistant.

In step 14, the virtual assistant prompts the user to describe the benefits products which are of interest to the user for purchase. In step 15, the system can evaluate the user's level of intent or urgency to purchase the benefits product in real time. In step 16, the system can identify and present relevant benefits products to the user through the virtual assistant based on eligibility determined by responses from the user presented to the virtual assistant. In one embodiment, the virtual assistant can utilize third party rate quoting services and specific underwriting guidelines and requirements from multiple benefits providers to identify and present relevant benefits products through the virtual assistant to the user.

In step 17, the virtual assistant can scan a network of live producers in a resident state of a user to identify a producer offering benefits products presented to the user during the session. In step 18, the virtual assistant can transfer the user, which can be a buyer or consumer, to a selected producer for enrollment. In one embodiment, the virtual assistant automatically transfers the user to the selected producer for enrollment. In some embodiments, the transfer of the user to a producer is made via a telephone or audio connection. Alternatively, the transfer of the user to a producer is made via an email or text. The user can select the medium for the type of transfer. In some embodiments, if after step 11, step 12 cannot be completed, the virtual assistant can transfer the buyer or consumer to a selected producer enrollment in step 18. In some embodiments, if after step 12, step 13 cannot be completed, the virtual assistant can transfer the buyer or consumer to a selected producer for enrollment in step 18. In some embodiments, if after step 13, step 14 cannot be completed, the virtual assistant can transfer the buyer or consumer to a selected producer for enrollment in step 18. In some embodiments, if after step 14, step 15 cannot be completed, the virtual assistant can transfer the buyer or consumer to a selected producer for enrollment in step 18. In some embodiments, if after step 15, step 16 cannot be completed, the virtual assistant can transfer the buyer or consumer to a selected producer for enrollment in step 18.

Figure 2:
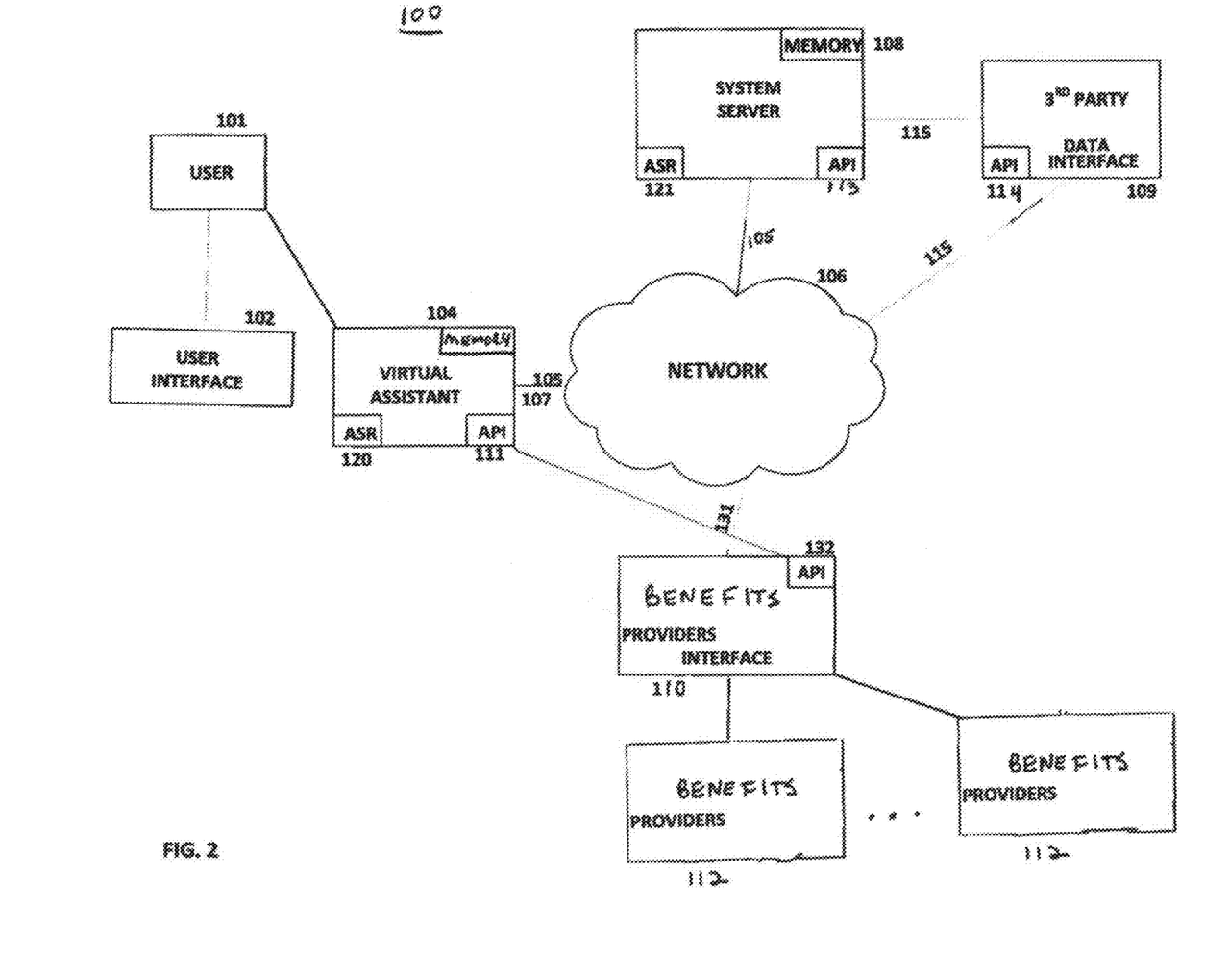
FIG. 2 is a block diagram of an embodiment of an artificial intelligence-based multi-channel system of the present invention.

FIG. 2 is a schematic diagram of an implementation of system 100. System 100 includes user interface 102 which is accessed by user 101. User interface 102 can be an electronic device such as a mobile telephony device including for example a mobile device, cell phone or smartphone. Mobile telephony devices can communicate with fourth generation (4G) or fifth generation (5G) cellular communications. It will be appreciated that other mobile telephony devices and networks can be used in accordance with the teachings of the present invention. User interface 102 communicates audio 103 to virtual assistant 104. Alternatively, user 101 communicates directly with virtual assistant 104.

Virtual assistant 104 can be a component which is artificial intelligence based to receive audio 103. Audio 103 can be digitized or interpreted by virtual assistant 104 into data 105. In one embodiment automated speech recognition (ASR) 120 can be performed at virtual assistant 104 or automated speech recognition (ASR) 121 can be performed server 108 to digitally convert received audible speech into transcribed text. Virtual assistant 104 can utilize commercial technologies including for example Sentiment Analysis, Tone Analyzer and Personality Insights to analyze data 105 and adjust parameters of virtual assistant 104. Virtual assistant 104 can be implemented in a natural language conversational manner for receiving information from user 101 and automatically generating responses to user 101 during the conversation. Virtual assistant 104 can have cognitive learning abilities. Virtual assistant 104 can include natural language processing and context switching. Virtual assistant 104 can include semantic memory, episodic memory for learning from past conversations, analytic memory for understanding trend of data, affective memory for understanding emotion and deep back projection networks for learning process flows via empirical learning. In some embodiments, the part of speech of content of the utterance of virtual assistant 104 is determined based on using a natural language parser (e.g., Stanford Natural Language Processing Group software or others as are known in the art) to parse the utterance. The part of speech of content of the utterance can indicate if the content is a noun phrase, verb phrase, and/or theme. In some embodiments, the type of speech of content of the utterance of virtual assistant 104 is determined based on using a natural language parser (e.g., Stanford Natural Language Processing Group software or others as are known in the art) to parse the utterance. Virtual assistant 104 using artificial intelligence techniques can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. The type of speech of content of the utterance can indicate if the content is a noun phrase, verb phrase, and/or theme. In some embodiments, the domain of the content of the utterance of virtual assistant 104 is determined based on pattern matching. Virtual assistant 104 can include components such as a processor, memory, storage, microphone, learning module, and operating system. An example, virtual assistant or virtual producer is described in U.S. Pat. No. 9,812,151 hereby incorporated by reference into this application. In some embodiments, virtual assistant 104 is a bot. A bot can be a software program that performs automated, repetitive, pre-defined tasks. Bots typically imitate or replace human user behavior. In some embodiments, virtual assistant 104 is a chatbot. A chatbot can be a software application used to conduct an on-line chat conversation via text or text-to-speech, in lieu of providing direct contact with a live human agent. The chatbot can simulate the way a human would behave as a conversational partner. In some embodiments, virtual assistant 104 uses conversational artificial intelligence (AI). In some embodiments, virtual assistant 104 is a cognitive digital assistant including a cognitive platform based on artificial intelligence (AI).

Data 105 is transferred over network 106 to server 108. For example, network 106 can be the Internet. Server 108 accesses third party data interface 109. For example, server 108 can access data 105 directly from databases of third party providers. For example, third party data interface 109 can be an interface to a third-party system for accessing third-party rate quote data. For example, server 108 can access third party data 115 directly from databases of third party providers. In one embodiment, application programming interface (API) 113 of server 108 or application programming interface (API) 111 of virtual assistant 104 is activated to communicate with application programming interface (API) 114 of third party data interface 109 to access data 115 from third party data interface 109. Alternatively, server 108 can access data 115 over network 106. For example, third party data interface 109 can include third party rate quoting services and specific underwriting guidelines and requirements from multiple benefits providers. Virtual assistant 104 may include a server, computer, laptop, PC, mobile device, or the like that includes a processor, a memory, and a communication device. Virtual assistant 104 and server 108 may include a plurality of computing devices connected together, e.g., via a network. The processor may include any general purpose or application-specific processor. The memory may include one or more tangible, non-transitory, machine-readable media.

Virtual assistant 104 and server 108 can connect to benefits providers' interface 110 over network 106. In one embodiment, benefits providers' interface 110 includes one or more application programming interface(s) (API(s)) 132. One or more benefits providers 112 communicate data 131 directed to benefits products using benefits providers' interface 110. In one embodiment, application programming interface (API) 113 of server 108 or application programming interface (API) 111 of virtual assistant 104 is activated to communicate with application programming interface (API) 132 of benefits providers interface 110 to access data 131 from benefits provider interface 110. Virtual assistant 104 or server 108 can scan one or more benefits providers 112 over network 106. Virtual assistant 104 can establish a connection between one or more benefits providers 112 and user 101 using virtual assistant 104 and user interface 102. Data 105, third-party data 115 and application requirements data 131 can be stored in memory 150 of system server 108. In one embodiment, API 111, API 113, API 114 and API 132 are web based APIs.

Figure 3:
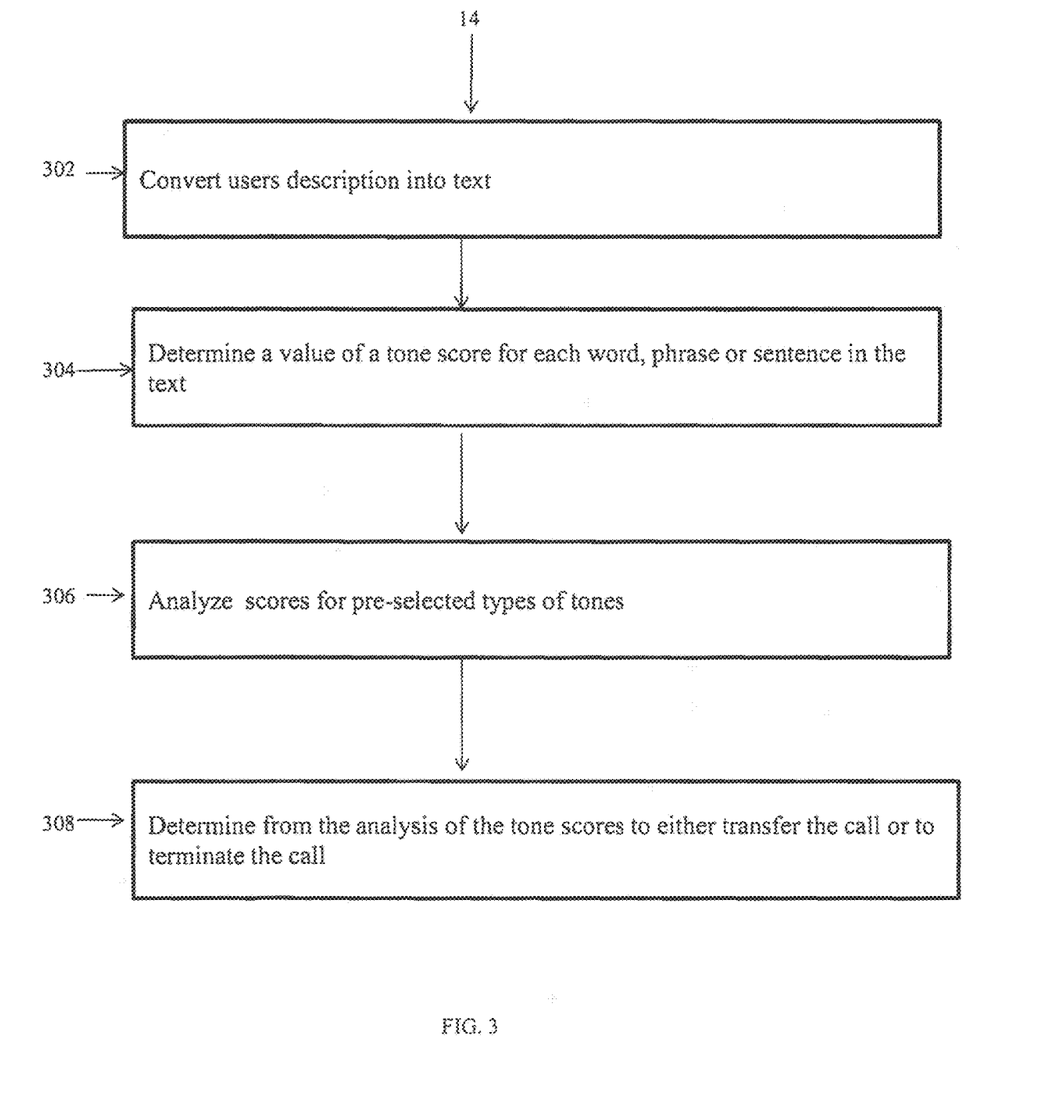
FIG. 3 is a flow diagram of an illustrative embodiment of a method for evaluating a user's level of intent or urgency to purchase a benefits product.

FIG. 3 is a flow diagram of an illustrative embodiment of a method to implement step 15 of FIG. 1 for evaluating a user's level of intent or urgency to purchase a benefits product. In step 302, the description of the benefits products which are of interest to the user for purchase which was received by the virtual assistant is converted to text. For example, a speech to text conversion can be performed at server 108 with automated speech recognition (ASR) 121 or virtual assistant 105 with automated speech recognition (ASR) 120 as shown in FIG. 2. The text can include one or more words, phrases or sentences.

Referring to FIG. 3, in step 304, a value of a tone score for each word, phrase or sentence in the text is determined. The tone score can be based on each individual word within the phrase or sentence. The tone score is the likelihood the word, phrase or sentence has characteristics of a particular tone. Example, tones can include tentative, anger, analytical, fear, joy, sadness and confidence. The tone score can be determined on a scale of 0 to 1.0 with a minimum score of 0 and a maximum score of 1.0. It will be appreciated that other scales can be used in accordance with the teachings of the present invention. In step 306, an analysis of the tone scores determined for one or more pre-selected types of tones is performed. For example, the analysis of the tone scores can be an average of each of the tone scores received for a particular tone, such as for example, tentative, anger and analytical.

In step 308, from the analysis of the tone scores, a determination is made to either transfer the call or to terminate the call. For example, it can be determined if the call should be transferred to a producer. The determination can be made from comparing the analyzed tone scores to a threshold tolerance value. For example, if one or more of the analyzed tone scores are less than the threshold tolerance value, the call will be transferred, and if one or more of the analyzed tone scores are greater than the threshold tolerance value, the call will be terminated.

Figure 4A:
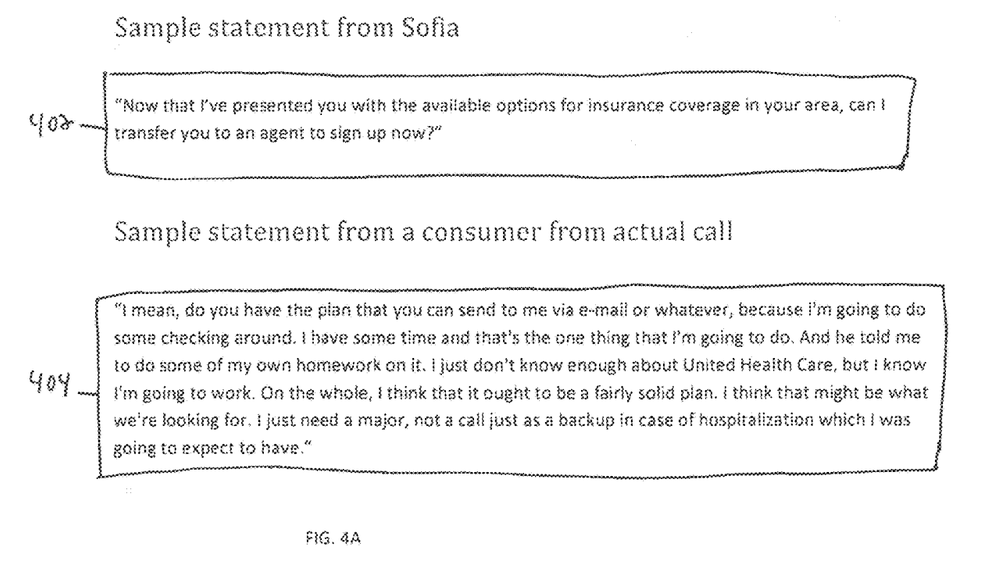
FIG. 4A is a schematic diagram of sample statements which can be uttered by the virtual assistant or by a user.
Figure 4B:
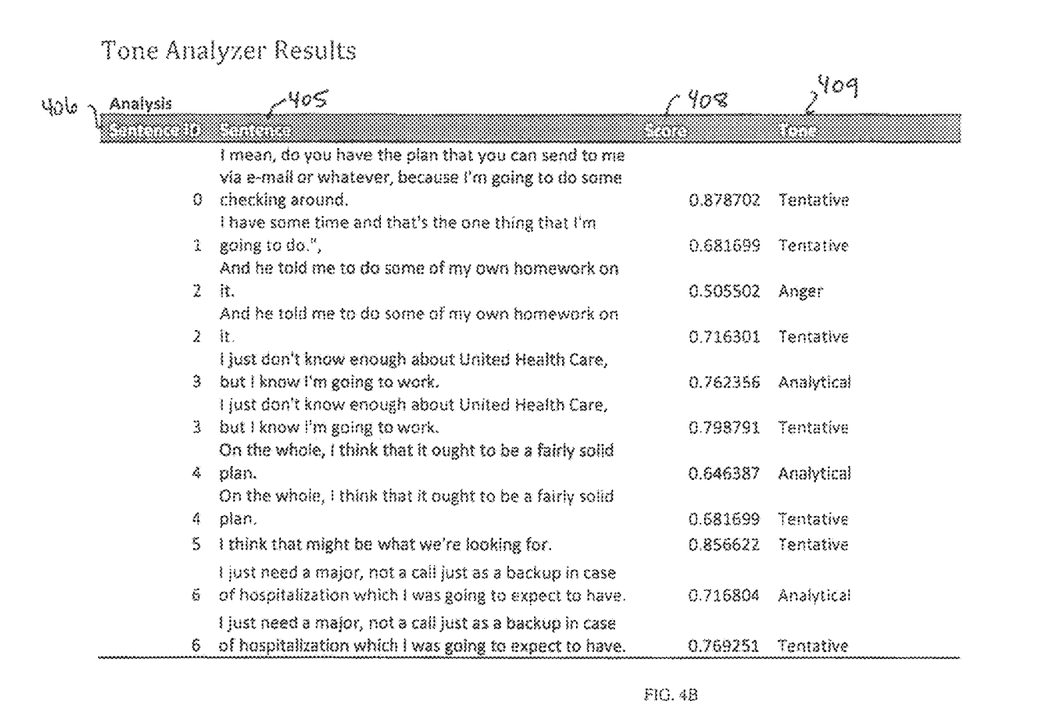
FIG. 4B is a schematic diagram of sample results from tone analysis.
Figure 4C:
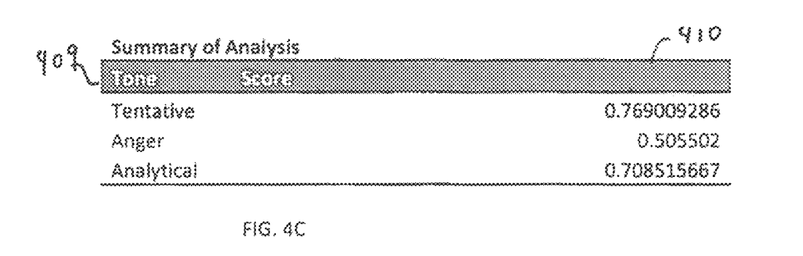
FIG. 4C is a schematic diagram of a sample analysis summary.
Figure 4D:
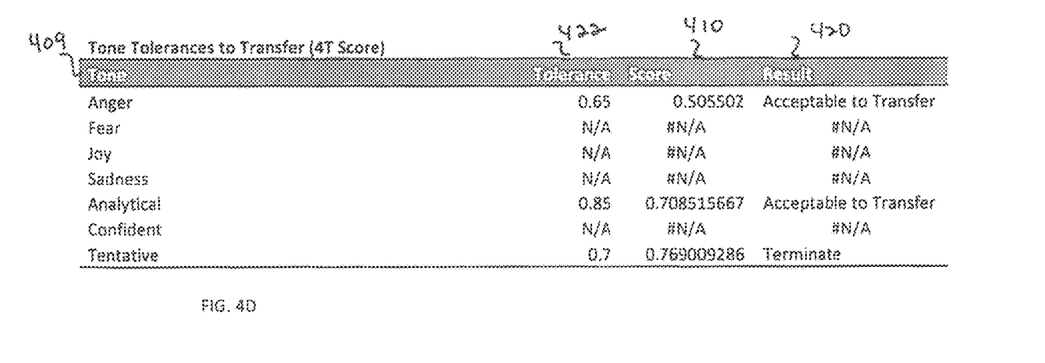
FIG. 4D is a schematic diagram of a sample analysis of tones scores to tone tolerances for determining to transfer or terminate the user to a producer.
Figure 4E:
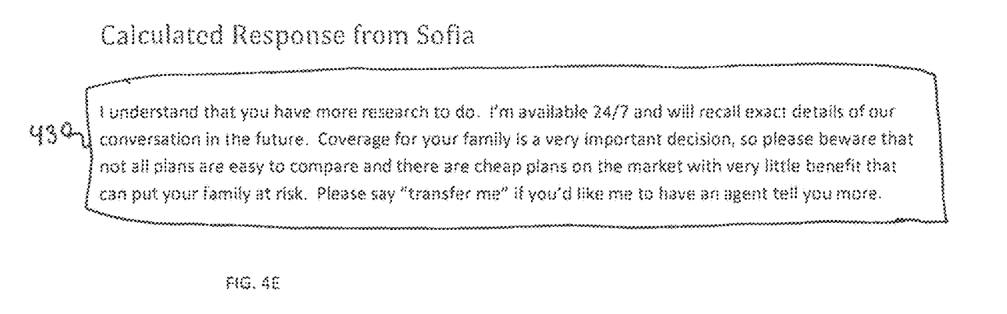
FIG. 4E is a schematic diagram of a sample statement which can be uttered by the virtual assistant.

An example of implementation of the method for evaluating a user's level of intent or urgency to purchase a benefits product is described by reference to FIGS. 2, 3 and 4A-4E. An example, virtual assistant statement 402 can be uttered by virtual assistant 104 as shown in FIG. 2 and FIG. 4A. In response to virtual assistant statement 402, a user statement 404 is uttered by user 101 at user interface 102. Speech to text conversion of user statement 404 can be performed at server 108 or virtual assistant 104. Referring to FIG. 4B, each sentence of text 405 of user statement 404 is assigned a sentence identification 406. An implementation of step 304 determines a value of a tone score 408 of each type of tone 409 for each sentence identification 406. Referring to FIG. 4C, an implementation of step 306, determines analysis score 410 of tone scores 408 for each type of tone 409. For example, analysis score 410 of tone scores 408 can be an average of each of the tone scores 408 received for a particular tone 409. Referring to FIG. 4D, an implementation of step 308 determines result 420 from analysis score 410 of tone scores 404 to either transfer the call or to terminate the call based on a comparison of analysis score 410 to threshold tolerance value 422. If result 420 indicates it is acceptable to transfer since analysis score 410 is less than threshold score 422, virtual assistant 104 utters virtual assistant statement 430. If result 420 indicates the call should be terminated since analysis score 410 is greater than threshold score 422, virtual assistant 105 or server 108 terminates the call session.

Embodiments of the present invention can be implemented in connection with a special purpose or general purpose computer device that includes both hardware and/or software components, including special purpose or general purpose computers.

Embodiments can also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

It is to be understood that the above described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A computer-implemented method for determining whether to transfer a user to a producer of products, the method comprising:
  engaging in a communication session, by a virtual assistant that is implemented on a processor-based computing system, with a user via a user interface;

receiving language input during the communication session by the virtual assistant from the user via the user interface, the language input containing words, phrases, or sentences;

interpreting the language input with artificial intelligence, by the virtual assistant during the communication session to generate data and language responses;

forwarding the language responses to the user interface to be presented to the user during the communication session;

prompting the user, by the virtual assistant during the communication session, for information pertaining to one or more products which are of interest to the user for purchase;

identifying, by the virtual assistant during the communication session, relevant products based on data collected from the user by the virtual assistant;

presenting, by the virtual assistant during the communication session, the identified relevant one or more products to the user via the user interface;

evaluating, by the virtual assistant during the communication session, a level of intent or urgency of the user to purchase the relevant one or more products, including determining a plurality of tone scores corresponding to a plurality of tone types for each of the words, phrases, or sentences of the language input received from the user via the user interface;

scanning, by the virtual assistant during the communication session, a network of producers and identifying a live producer offering the identified products presented to the user by the virtual assistant;

determining, by the virtual assistant during the communication session, whether or not to transfer the user to the identified live producer based on application of transfer criteria to the evaluated level of intent or urgency of the user; and in response to satisfaction of the transfer criteria, initiating by the virtual assistant during the communication session, a transfer of the user to the identified live producer.

2. The method of claim 1 wherein prompting a user for information includes prompting the user to answer one or more pre-qualifying questions and the identification of the relevant benefits products being determined from eligibility of the user based on answers to the one or more pre-qualifying questions.

3. The method of claim 1 further comprising adjusting parameters of the virtual assistant to accommodate the user.

4. The method of claim 1 wherein the virtual assistant further determines a tone score from the information pertaining to the one or more products, and wherein the virtual assistant further determines to transfer the user to the identified live producer if the tone score has a value less than a threshold tolerance value and to not transfer the user to the identified live producer if the tone score has a value more than a threshold tolerance.

5. The method of claim 4 wherein a tone score is determined for one or more user statements uttered during the description given by the user to the virtual assistant.

6. The method of claim 1 wherein scanning the network of producers includes scanning producers in a resident state of the user.

7. The method of claim 1 wherein the virtual assistant transfers the user to the live producer by a telephone or audio connection.

8. The method of claim 1 wherein the virtual assistant transfers the user to the live producer by email or text.

9. A system for determining whether to transfer a user to a producer of products, the system comprising:

a processor-based computing system that is operative to engage in a communication session with a user via a user interface, the computing system further operative to access a virtual assistant operative to interact with the user via the communication session;

wherein the virtual assistant is operative, during the communication session, to:

receive language input from the user, the language input containing words, phrases, or sentences;

interpret the language input with artificial intelligence to generate data and language responses;

forward the language responses to the user interface to be presented to the user;

prompt the user for information pertaining to one or more products which are of interest to the user for purchase;

identify relevant products based on data collected from the user by the virtual assistant;

present the identified relevant one or more products to the user via the user interface;

evaluate a level of intent or urgency of the user to purchase the relevant one or more products based on determining a plurality of tone scores corresponding to a plurality of tone types for each of the words, phrases, or sentences of the language input received from the user via the user interface;

scan a network of producers and identify a live producer offering the identified products presented to the user;

determine whether or not to transfer the user to the identified live producer based on application of transfer criteria to the evaluated level of intent or urgency of the user; and in response to satisfaction of the transfer criteria, initiate a transfer of the user to the identified live producer.

10. The system of claim 9, wherein the processor-based computing system comprises a server operative to be communicatively coupled to the user interface.

11. The system of claim 10, wherein the server implements the virtual assistant.

12. The system of claim 9, wherein the language input comprises audio captured via the user interface.

13. The system of claim 9, wherein the language input comprises text entered via the user interface.

14. The system of claim 9, wherein the language responses comprises audio to be played via the user interface.

15. The system of claim 9, wherein the language responses comprises text to be displayed via the user interface.

16. The system of claim 9, wherein the user interface comprises a telephone.

17. The system of claim 9, wherein the user interface comprises device that implements a Web browser.

18. The system of claim 9, wherein the virtual assistant implements cognitive learning functionality.

19. The system of claim 9, wherein the virtual assistant is implements a natural language parser.

20. The system of claim 9, wherein the virtual assistant is implements conversational artificial intelligence (AI).

21. The system of claim 9 wherein parameters of the virtual assistant are adjusted to accommodate the user.

22. The system of claim 9, wherein the computing system is further operative to implement an application programming interface (API) that is accessible by each producer of the network of producers, and operative to receive information about one or more corresponding products from each producer.

23. At least one non-transitory machine-readable storage medium comprising instructions that, when executed by a processor-based computing system, cause the computing system to:
engage in a communication session with a user via a user interface;
access a virtual assistant operative to interact with the user via the communication session;
during the communication session, cause the virtual assistant to:
receive language input from the user, the language input containing words, phrases, or sentences;
interpret the language input with artificial intelligence to generate data and language responses;
forward the language responses to the user interface to be presented to the user;
prompt the user for information pertaining to one or more products which are of interest to the user for purchase;
identify relevant products based on data collected from the user by the virtual assistant;
present the identified relevant one or more products to the user via the user interface;
evaluate a level of intent or urgency of the user to purchase the relevant one or more products based on determining a plurality of tone scores corresponding to a plurality of tone types for each of the words, phrases, or sentences of the language input received from the user via the user interface;
scan a network of producers and identify a live producer offering the identified products presented to the user;
determine whether or not to transfer the user to the identified live producer based on application of transfer criteria to the evaluated level of intent or urgency of the user; and
in response to satisfaction of the transfer criteria, initiate a transfer of the user to the identified live producer.

24. The at least one non-transitory machine-readable storage medium of claim 23, wherein the instructions, when executed, further cause the virtual assistant to automatically transfer the user to the identified producer to engage in a telephone or audio communication.

25. The at least one non-transitory machine-readable storage medium of claim 23, wherein the instructions, when executed, further cause the virtual assistant to automatically transfer the user to the identified producer to engage in a communication via email or text.

26. The at least one non-transitory machine-readable storage medium of claim 23, wherein the instructions, when executed, further cause the virtual assistant to operate as a bot, chatbot or cognitive digital assistant.

* * * * *